United States Patent Office 3,504,857
Patented Apr. 7, 1970

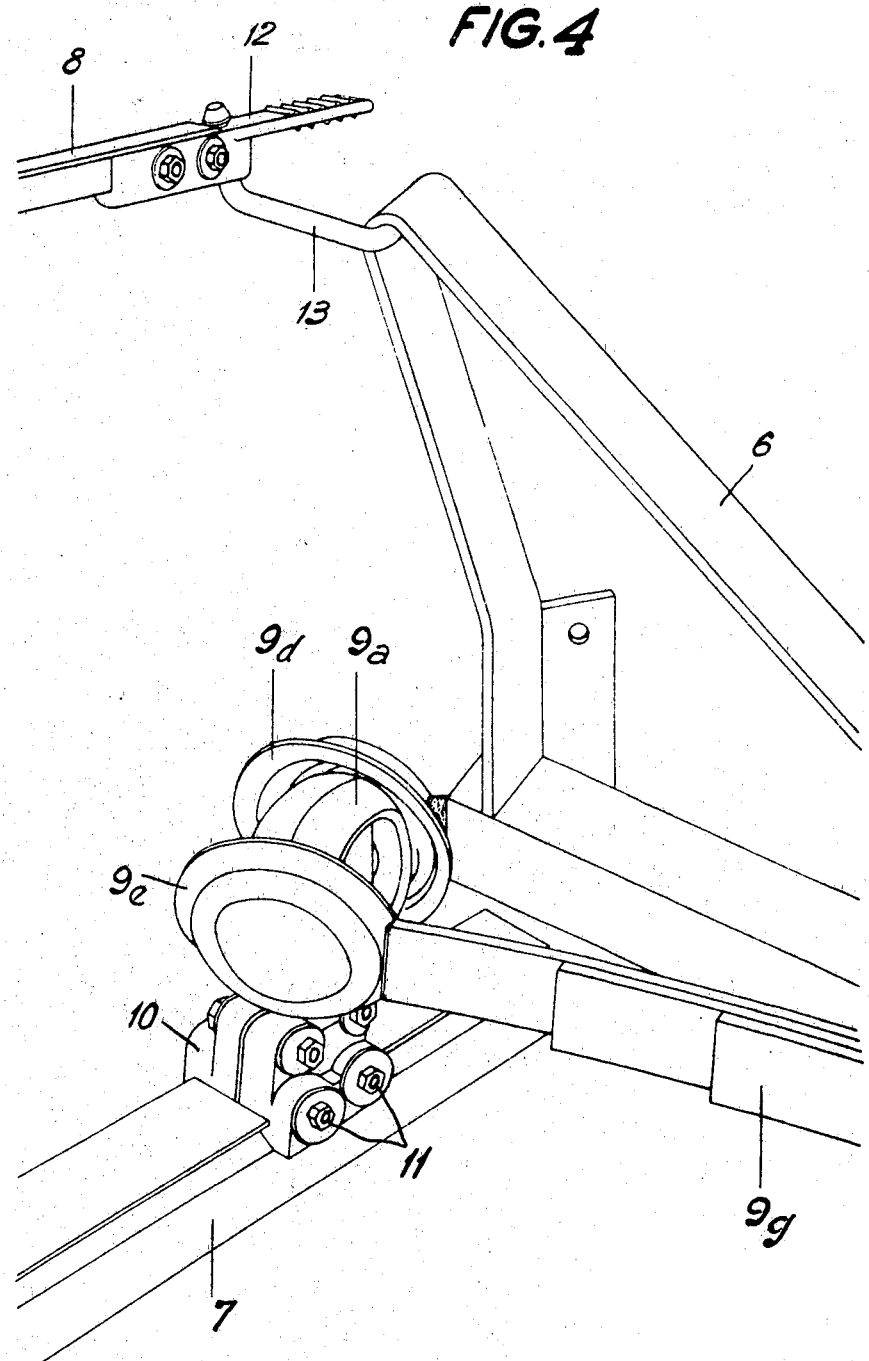

3,504,857
LIQUID SPRAYERS FOR THE TREATMENT OF CROPS
Vincent P. M. Ballu, Epernay, Marne, France, assignor to Tecnoma, Paris, France, a French body corporate
Filed Feb. 21, 1968, Ser. No. 707,108
Claims priority, application France, Mar. 6, 1967, 97,567
Int. Cl. B05b 1/20
U.S. Cl. 239—168                                  8 Claims

ABSTRACT OF THE DISCLOSURE

A sprayer made of a central section and two lateral sections, foldable over the central section and swingable laterally to clear obstacles. Each section has a U-shaped beam for receiving therein a pipe to which are secured spray nozzles; and the connection of each lateral section to the central section being such as to tend to maintain the lateral sections in substantial alignment with the central section.

BACKGROUND OF THE INVENTION

The manufacture of sprayers which carry a plurality of spray nozzles for spraying liquid chemicals over cultivated lands presents considerable difficulties. In fact, the tendency is to make these devices as wide as possible, and because the vehicles on which they are mounted also tend to be driven at higher speeds it is equally important to improve the rigidity of such sprayers to enable them to withstand considerable vibration due to the irregularities of the ground over which the carrying vehicles travel.

The object of the invention is to provide an improved wide sprayer structure in which the lateral sections are swingable to clear obstacles during spraying operations, and which can be folded into a relatively compact arrangement for transportation and storage purposes. The invention also allows light constructions with increased resistance to wear due to vibration.

SUMMARY OF THE INVENTION

This invention therefore provides an apparatus for spraying liquids, which comprises a central section adapted for mounting to a vehicle, two lateral sections each normally extending from the ends of said central section, each section including a plurality of spray nozzles and means to supply liquid to the nozzles; and coupling means for connecting each lateral section to the central section and allow swinging of the lateral sections to clear obstacles encountered during spraying, and allow folding of the lateral sections over the central section.

In accordance with a feature of this invention the racks for the spray nozzles are U-shaped beams provided with inner flanges for receiving therein a pipe provided with spray nozzles.

The resistance to bending of such beams enables them to constitute the main structural element in the construction of the lateral section of arms, which greatly simplifies the construction and permits the use of lateral arms of greater lengths.

DESCRIPTION OF THE DRAWING

In the accompanying drawings in which an exemplary embodiment in accordance with this invention is illustrated.

FIGURE 4 is a partial perspective view showing the articulation of the lateral arm seen in FIGURE 2.

DESCRIPTION OF A PREFERRED EMBODIMENT

Figure 1:
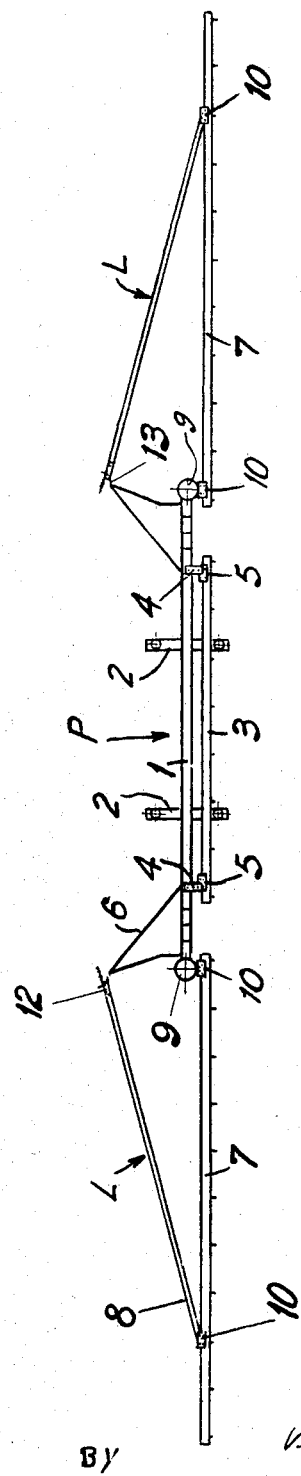
FIGURE 1 is a schematic front view of a sprayer in accordance with this invention.

In the embodiment illustrated in the drawings the sprayer comprises a central section P at each end of which is articulated a lateral section or arm L.

The structure of the section P comprises a cross-piece 1 and fixing bars 2 for mounting the sprayer to a vehicle (not shown), the cross-piece 1 being normally horizontal.

Figure 2:
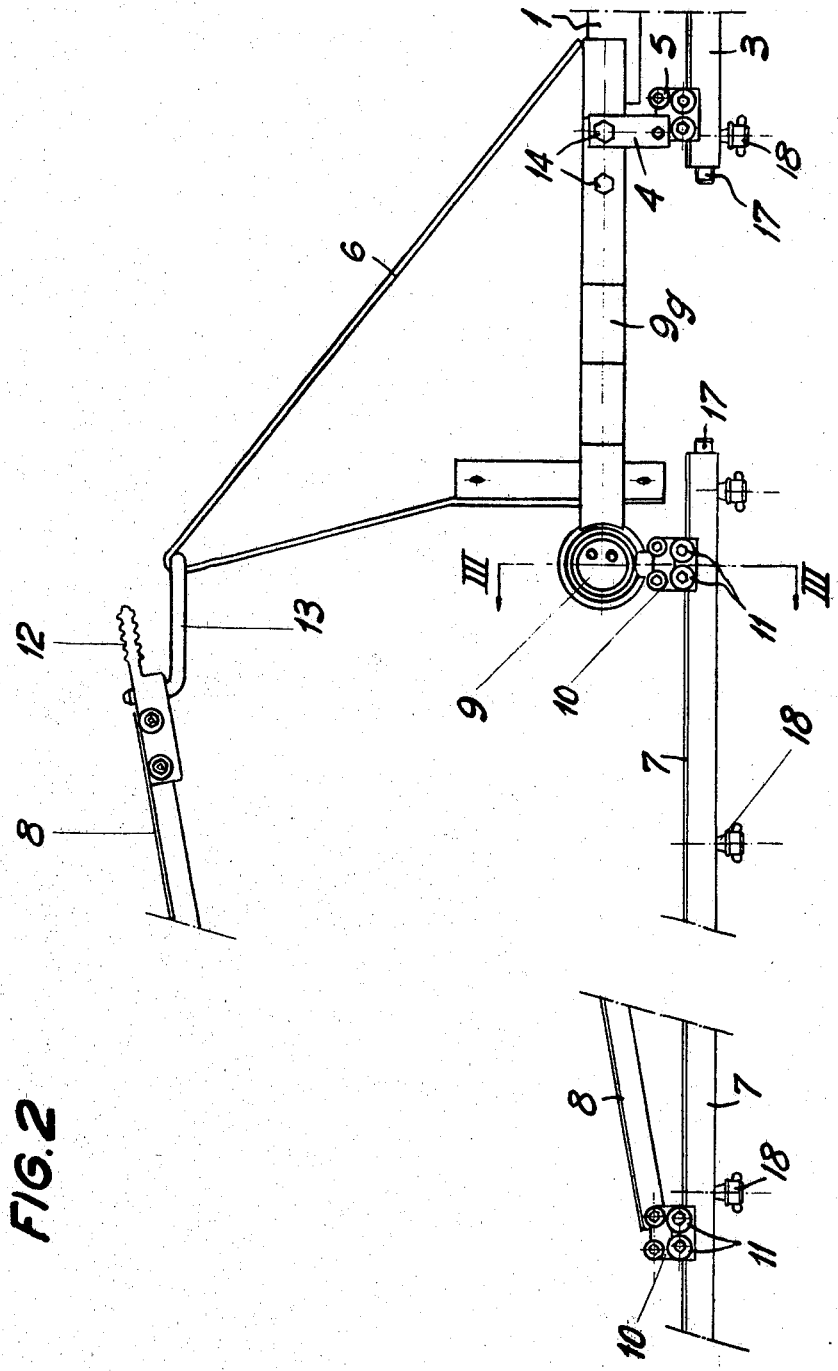
FIGURE 2 is a partial front view on a larger scale showing details of the coupling means for the lateral arm seen in the right portion of FIGURE 1.

A central rack member 3 is secured below the cross-piece 1 by means of lugs 4 and clamps 5 (FIGURES 1 and 2).

As best illustrated in FIGURES 2 and 4, cross-piece 1 is provided at each end with a bracket 6 for articulately connecting the lateral arms L.

The coupling means for each lateral arm is designed in such a manner that the arms L can be folded over the central section P or cross-piece 1 by rotataion around horizontal axes perpendicular to cross-piece 1 and at the ends thereof, and can be pivoted around oblique axes. The first folding motion serves to reduce the width of the sprayer for transport and storage purposes by folding the lateral arms L over the central section P. The motion of the lateral arm L around the oblique axes enables them to swing clear of obstacles encountered. The oblique axes project outwardly above the central section so that the arms rise as they pivot, which causes their automatic return to the fully extended position substantially in alignment with central section P.

Lateral arms L comprise rack elements 7 which extend from the ends of the central rack member 3 in the extended position. Rack elements 7 are secured to oblique tie-beams 8 and to ball joint 9 by means of clamps 10 and bolts 11 (FIGURE 2).

The tie-beam 8 of each lateral arm is hooked to a pivot pin 13 secured to the corresponding bracket by means of a pivot element 12 for example, of rubber. This pivot point is positioned above the ball joint 9 but slightly outwardly of the vertical line through the ball joint 9 with respect to the central section P as shown in FIGURE 2, and for the purpose set forth above.

Figure 3:
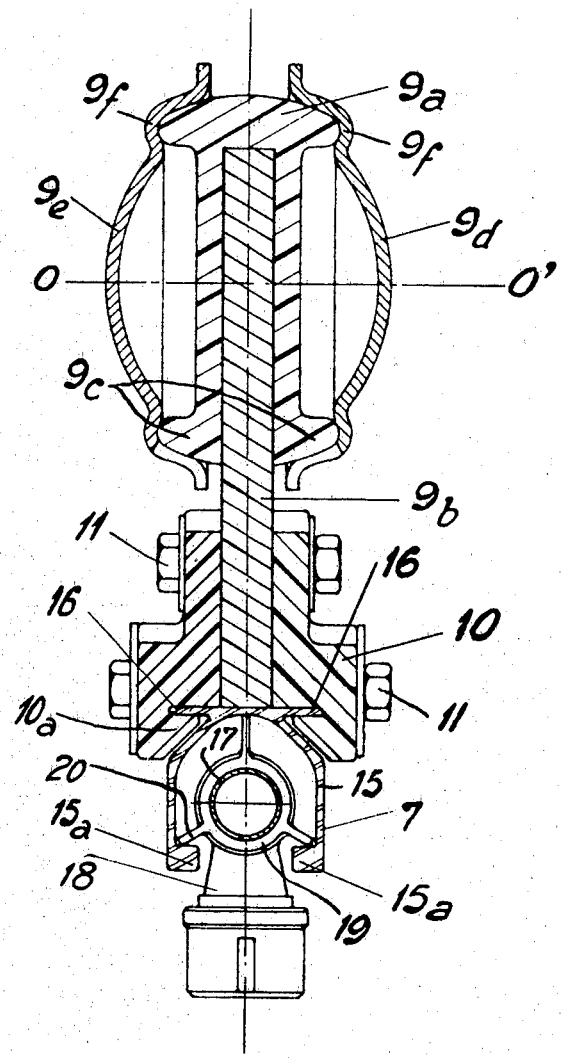
FIGURE 3 is an enlarged cross-sectional view taken along line III—III of FIGURE 2.

As can be seen in FIGURES 3 and 4 ball joint 9 comprises a disc-shaped member 9a, preferably of synthetic rigid material (for example polyamide) mounted on a web 9b which is secured to clamp 10 by means of bolts 11. Disc-shaped member 9a is in the shape of the central segment of a sphere, and is symmetrical with respect to the central plane of web 9b, and the faces of member 9a are hollowed out in order to provide peripheral ribs 9c. The plane of web 9b is coincident with that of arm L.

Disc-shaped member 9a is resiliently clamped between two cup-shaped sockets 9d and 9e which present grooves 9f for normally receiving ribs 9c. Socket 9d is secured to bracket 6 (FIGURE 4) whereas socket 9e is fixed to a leaf spring 9g which is secured to bracket 6 by bolts 14 as can be seen in FIGURE 2. Spring 9g resiliently urges socket 9e towards socket 9d.

Each rack members 3 and 7 is formed of a U-shaped beam 15 of which the legs present inner flanges 15a and the bottom of the U-shaped beam is provided with laterally projecting wing-like portions 16. Flanges 15a and wing-like portions 16 provide excellent bending resistance to beam 15. Wing-like portions 16 are also used for mounting the U-shaped beam in an inverted position by clamps 10 of which jaws 10a are in contact with the underside of winglike portions 16 as shown in FIGURE 3.

Each beams 15 thus receives and holds the nozzles and the associated supply means, represented in FIGURE 3 by a longitudinal pipe 17 to which are connected spaced apart spray nozzles 18. Each nozzle 18 presents a tubular collar 19 provided with three longitudinal fins 20 by means of which collar 19 is held within beam 15; these fins bear against flanges 15a and the bottom of beam 15 respectively as shown in FIGURE 3.

In assembly the pipe is pushed through the collars of the spray nozzles with slight frictional engagement and the collars are sealed to the pipe at pre-determined places having regard to the position of distribution holes already provided. Fins 20 ensure automatic centering of the pipe and the spray nozzles inside beam 15.

It will be noted that with this arrangement it is possible to assemble racks of different lengths since the U-shaped beams are simply clamped by clamps 10 without drilling or welding the elements, and since the lengths of the pipes and the number of nozzles mounted thereon can be varied at will.

FIGURE 4 shows how the lateral arms swing clear of obstacles around ball joints 9 and pivot joint 12, 13. Disc-shaped member 9a rotates and separates sockets 9e and 9d against the action of spring 9g. The upper pivotal connection 12, 13 is disposed outwardly of the vertical line through ball joint 9 so that as a lateral arm swings out upon occurrence of an obstacle it generates a conical surface and its center of gravity rises which causes automatic return to its working position in which ribs 9c of disc-shaped member 9a are seated into grooves 9f of the sockets.

Folding of the arm arrangement is effected in a vertical plane: once pivot element 12 is out of engagement with hook 13, tie-beam 8 is laid over rack member 7 and then the assembly is rotated around axis OO' of the disc-shaped member (FIGURE 3) and positioned over the central section of the sprayer.

What is claimed is:

1. Apparatus for spraying liquids in the treatment of crops, comprising an elongated central section adapted for mounting to a vehicle; two lateral sections each normally extending from a different one of the ends of said central section, each section including a plurality of spray nozzles; means to supply thereto a liquid to be sprayed; and coupling means for connecting each lateral section to said central section to allow swinging of said lateral sections to clear obstacles encountered during spraying and to allow folding of said lateral sections over said central section for storage or transportation purposes, said coupling means comprising a ball point joint and a pivot joint for each of said lateral sections.

2. Apparatus in accordance with claim 1, characterized in that said ball joint comprises a disc-shaped member and two sockets resiliently urged towards one another in a face-to-face relationship, said sockets receiving said disc-shaped member therebetween and allowing rotation thereof about more than one axis.

3. Apparatus in accordance with claim 2, wherein said disc-shaped member has circular ribs on its faces, said ribs cooperating with centering grooves provided in said sockets.

4. Apparatus in accordance with claim 3, characterized in that said pivot joint is detachable and located above said ball joint but slightly outwardly thereof with respect to said central section.

5. Apparatus in accordance with claim 1, wherein each of said lateral sections is formed of a U-shaped beam to which are secured said ball joint, and one end of a tie-beam, the other end of said tie-beam presenting an element of said pivot joint.

6. Apparatus for spraying liquids in the treatment of crops, comprising an elongated central section adapted for mounting to a vehicle; two lateral sections each normally extending from a different one of the ends of said central section, each section including a plurality of spray nozzles; means to supply thereto a liquid to be sprayed; and coupling means for connecting each lateral section to said central section to allow swinging of said lateral sections to clear obstacles encountered during spraying and to allow folding of said lateral sections over said central section for storage or transportation purposes, each of said sections comprising a U-shaped beam having inner flanges for retaining within said U-shaped beam said supply means and said spray nozzles.

7. Apparatus in accordance with claim 6, wherein each spray nozzle comprises a collar having guide fins allowing it to be mounted in said U-shaped beam, said supply means comprising a pipe extending through said collars of said spray nozzles.

8. Apparatus in accordance with claim 7 characterized in that said beam presents, at right angles to its bottom, lateral wing-like portions adapted to cooperate with supporting clamps.

References Cited

FOREIGN PATENTS 1,363,398    5/1964    France.

M. HENSON WOOD, Jr., Primary Examiner

M. Y. MAR, Assistant Examiner

U.S. Cl. X.R.

239—169, 176; 285—133; 287—89